United States Patent Office 2,895,501
Patented July 21, 1959

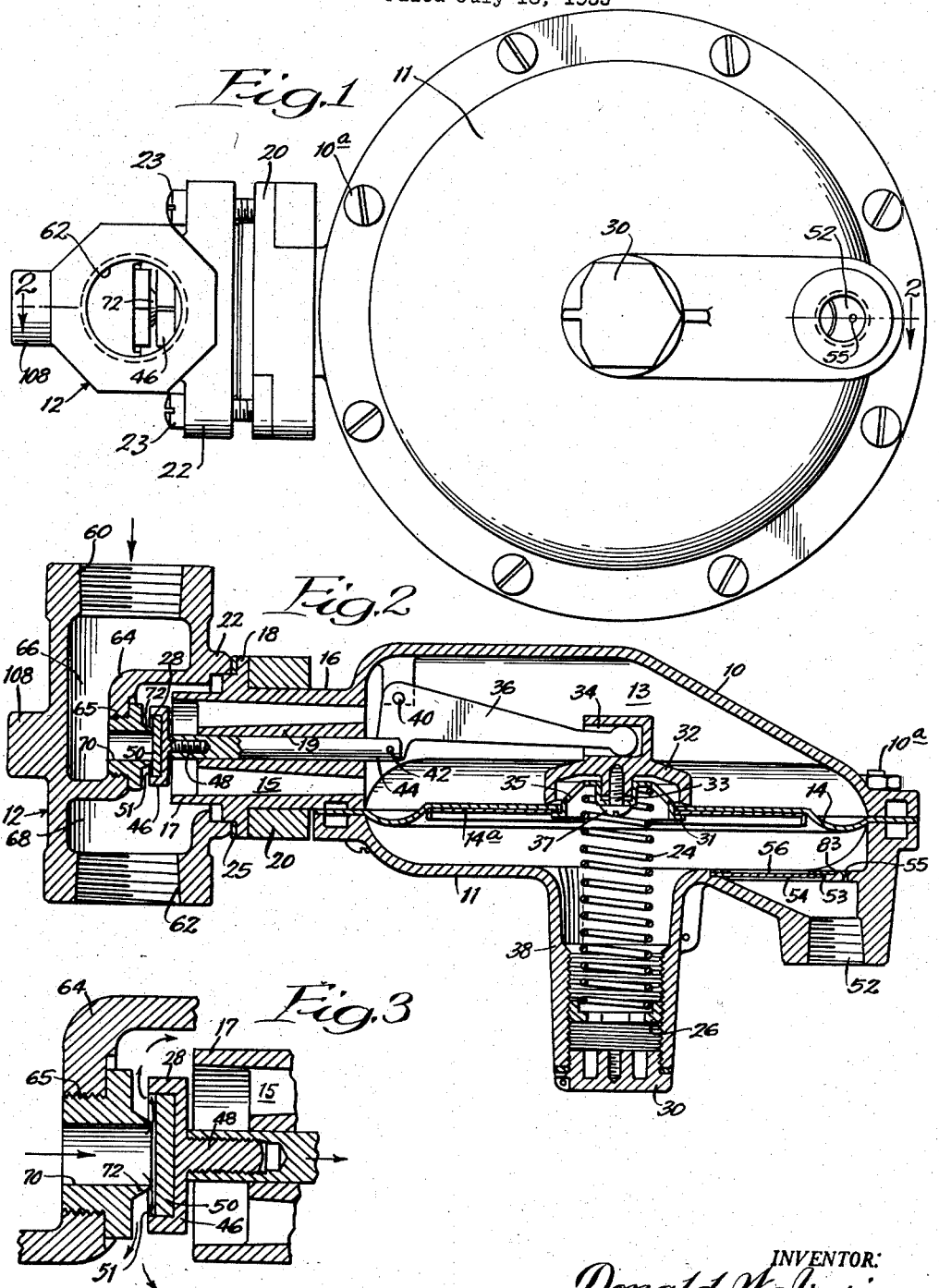

2,895,501

PRESSURE REGULATOR CONSTRUCTION

Donald W. Irwin, Marshalltown, Iowa, assignor to Fisher Governor Company, Marshalltown, Iowa, a corporation of Iowa Application July 18, 1955, Serial No. 522,585

4 Claims. (Cl. 137—484.4)

This invention relates to a pressure regulating valve which is particularly adapted for use in gas lines to provide gas under constant reduced pressure from a high pressure supply line. Such regulators are used primarily for natural gas, but are suitable for pressure regulation of most fluids. One common use for the regulating valve of the invention is for reducing the gas main pressure to lower pressure required for appliances in residences, such as stoves, water heaters, furnaces and the like.

The regulating valve is of the spring biased diaphragm type. As the demand on the downstream side of the valve is increased, the pressure in the diaphragm cavity is reduced, thus causing the diaphragm to move downwardly (when positioned with the bonnet up) under the influence of the spring. The downward movement of the diaphragm actuates means to open the valve to permit greater volumes of gas to flow therethrough, thus meeting the increased demand at the desired pressure. The valve remains open to the extent required to meet the demand as long as the demand continues. Upon reduction in demand, as for example when one of the appliances is shut off, the pressure on the downstream side tends to increase, causing the diaphragm to move upwardly against the force of the spring, thus closing the valve to the extent required to meet the reduced demand and while maintaining substantially constant pressure.

When the compression spring utilized in the diaphragm housing is extended, upon increased demand on the downstream side, it exerts less force than when it is under greater compression. This is an inherent characteristic of a coil spring. The weakness of the spring in extended position results in the valve opening insufficiently to meet the demand, and as the gas flow increases, the pressure decreases. It has been suggested previously to compensate for the variability in the compression resistance of the spring by providing additional elements in the form of compensating devices in the valve. One such compensating device consists of a Pitot tube extending from the diaphragm cavity into the gas stream on the demand or downstream side of the valve housing. This and other means are well known and are used in commercial valve constructions. Incorporation of such devices into the pressure regulating valve greatly increases its cost and limits its adaptability by complicating the construction. Some of the problems encountered in using a valve of the Pitot tube type are described in Patent No. 2,619,983.

It is, therefore, an object of the present invention to provide means for compensating for the reduced force of the spring, when extended, which is of simple design and which requires no elements other than those normally used in the construction of the valve.

Another object is to provide a valve member which is so constructed as to divert the flow of air through the valve in such a manner as to reduce the pressure within the diaphragm cavity to supplement the force of the extended spring.

Another object is to provide a valve member in which the disc cooperating with the valve seat may be readily replaced when it becomes worn or damaged.

Another object of the invention is to provide a regulating valve which is reliable in operation, simple in construction and which may be easily assembled and adjusted to provide substantially constant pressure on the downstream side.

These and other objects and advantages will become apparent from the following description when read in conjunction with the accompanying drawings, in which:

Figure 1 is a plan view of the pressure regulating valve of the invention;

Figure 2 is a sectional view taken along the line 2—2 of Figure 1; and

Figure 3 is an enlarged sectional view showing the improved compensating means for the variability in force inherent in the diaphragm coil spring.

Referring now to the drawings, the valve consists of a diaphragm body member or housing 10 having a shallow generally circular cavity 13 therein which connects with the valve housing 12 through a conduit or hub portion 16. The conduit 16 may be cast integrally with the body member 10 from any suitable metal, such as aluminum. The valve housing 12 has a threaded inlet opening 60 and a threaded outlet opening 62 through which the gas flows. The opening 60 connects to the supply pipe or source of gas at high pressure and the opening 62 is similarly engaged with the pipe which connects to the demand. The valve housing is divided into two chambers—66 on the upstream side and 68 on the downstream side—by means of a web 64. The web contains an opening 70 which is adapted to be opened and closed by means of a valve member, as explained hereinbelow.

The diaphragm body member 10 has a bonnet 11 which is fixed to the flange of the body by means of a plurality of circumferentially spaced bolts 10a. A flexible diaphragm 14 is sandwiched and clamped between the body and the bonnet. The diaphragm is made from a rubber-like material which may be reinforced with fabric or other suitable flexible material responsive to change in fluid pressure within the body. The central portion of the diaphragm is reinforced by means of a rigid disc 14a. The connecting conduit 16 has a circumferentially extending flange or shoulder 18 which is brought into sealing engagement with the cooperating gasket 25 and the flange 22 on the valve housing by means of machine screws 23 which screw into the split collar 20 that bears against the flange 18, Figures 1 and 2. The conduit 16 has a central bearing 19 disposed by means of a web within the opening 15, through which opening the chamber 68 of the valve housing 12 communicates with the cavity 13. A valve stem 44 is adapted to slide within the bearing to open the valve member 28 within housing 12, as indicated below.

The diaphragm 14 is urged upwardly (when in the position shown in Figure 2) by means of the compressed coil spring 24, which bears against a spider 35 clamped by means of flange 31 to the marginal edge of the diaphragm 14 and supporting disc 14a surrounding a central opening therethrough. The spider 35 has a hollow boss 33 for holding the end of the spring 24. A cup-shaped bell crank receiver 32 is fixed to the spider 35 and the diaphragm 14, 14a by means of a screw 37 extending through the boss, and contains a socket or slot in its outer end opening laterally to the cavity 13 into which the rounded end of a bell crank 36 extends. The other end of the bell crank 36 has two spaced pivots 40 and 42; pin 40 being fixed to a support projecting from the body member and the pin 42 connecting to the end of the valve stem 44 which is slidably disposed within the sleeve or bearing 19. The movement of the diaphragm 14 due to variation of pressure within the cavity 13 moves the receiver 32 to actuate the bell crank 36 to open and close the valve.

The tubular portion 38 of the bonnet 11 encloses the spring 24 and is internally threaded to take an adjusting screw 26 adapted to apply varying pressure on the spring 24, thus allowing the gas pressure on the downstream side of the valve to be varied as desired. The more the spring is compressed, the greater will be the pressure required in the cavity 13 to counterbalance it. A suitable plug 30 may be provided to close off the tubular portion of the bonnet.

Referring now to the valve housing 12, the opening 70 through the web has a seat 72 terminating in a tapered edge which is adapted to engage the resilient disc 50 seated within the cup-shaped head 46 of the valve member 28. In the construction illustrated, the opening 70 comprises part of an insert which screws into the original web opening 65 and provides the seat 72. If desired, the seat 72 may be formed integrally with the web. The head 46 of valve member 28 has a threaded stud 48 projecting normally therefrom which is adapted to screw into a tapped opening in the end of the stem 44 which permits the valve disc to be replaced should it become worn or damaged. The valve disc 50 is made from a resilient material, such as synthetic rubber or a plastic substance, which is resistant to the particular gases which will flow through the pressure regulating valve. The disc 50 must form a gas-tight seal when it bears against the tapered edge of the seat 72.

It will be noted that the end 17 of the conduit 16 extends through the wall of the valve housing 12 and terminates above the surface of the seat 72. The valve member 28 is adapted to move in the space between the outer end 17 of the hub 16 and the valve seat 72. Referring to Figure 3, it will be noted that the disc 50 is recessed below the upper edge of the side wall of the cup-like head 46 of valve member 28, which results in a lip or projection 51 around the circumference of the valve head. The purpose of the lip 51 is to deflect the gas which is flowing rapidly past the seat 72 around or past the opening 15 extending through the conduit member 16.

In operation, the valve housing 12 is connected to a source of high pressure gas at the connection 60. The demand line, to be supplied with gas at constant reduced pressure, is connected to the opposite side 62. The gas is adapted to flow through the inlet chamber 66, up through the opening 70 in the web 64, into the chamber 68, and out through the pipe leading to the demand through the threaded opening 62. To regulate the pressure of gas on the demand side so that it remains constant regardless of the volume being used, the screw 26 in the tubular portion of the bonnet 38 is turned down to adjust the force exerted by the spring against the diaphragm. The extent of compression of the spring 24 determines the pressure of the downstream gas. The compressed spring 24 normally exerts pressure against the diaphragm housing 14 tending to move it down into the body of the diaphragm, thus actuating the bell crank 36 which in turn causes the valve stem 44 to move within the bearing 19 and regulate the distance between the valve disc 50 and the seat 72. Obviously, the greater the force exerted by the spring, the higher the disc is lifted from its seat and the greater the volume of gas permitted to flow through the valve. Assume that the gas is flowing through the valve at a substantially constant rate when an appliance is turned on within the residence and an increased load is placed upon the gas demand line. In such case the pressure in the valve chamber 68 is lowered and likewise the pressure within the cavity 13 is lowered since the chamber 68 is in direct communication therewith through the opening 15 within the conduit 16. When the pressure within the diaphragm housing is reduced, the spring 24 forces the diaphragm downwardly (when positioned with the bonnet up) and this in turn causes the valve to open further, in the manner indicated above.

When the valve is set for very low pressure operation or when the pressure within the diaphragm cavity is low due to increased demand, the spring is extended considerably and, consequently, requires much less force to compress than when it has been deflected to, say, 25% to 40% of its free length. In order to compensate for this undesirable effect I have provided booster means for assisting the spring by further decreasing the pressure in the diaphragm cavity 13. Gas flowing through the opening 70 in the web 64 of the valve flows outwardly around the seat 72 through a very narrow space provided between the top of the seat and the outer surface of the disc 50. This gas, travelling at high velocity, and in comparatively large volumes because the valve is open comparatively wide, strikes the lip or projection 51 on the valve head 46 and is deflected past the end 17 of the conduit 16, as shown by arrows in Figure 3. The stream of gas flowing past the end of opening 15 causes the pressure within the diaphragm cavity 13 to be reduced by an aspirator effect. The reduction of pressure in this manner supplements the force of the spring in moving the diaphragm 14 upwardly when positioned as shown in Figure 2. It will be noted that this booster principle has been incorporated into the regulator without undue complications or any added cost. The rubber-like valve disc is molded into the cup-like head 46 so that it lies, for example, about 1/32 of an inch below the edge of the cup-like head. The amount of boost contributed by the aspirator effect may be controlled by the location of the upper edge of the head 46 above the end 17 of the conduit 16.

It will be obvious to those skilled in the art that changes may be made in the construction of the various elements and their relationship one to the other without departing from the true spirit and scope of my invention, as pointed out in the appended claims. It is, therefore, not my intention to limit the invention to the specific forms shown and described other than as necessitated by the scope of the claims.

What I claim as new and desire to secure by Letters Patent of the United States is:

1. In valve means for controlling the flow of fluid, a diaphragm body member having a shallow cavity therein, a bonnet constituting a cover for said cavity, a flexible diaphragm clamped between said bonnet and said body member, a spring in said bonnet bearing upon said diaphragm, the position of said diaphragm being responsive to the pressure of fluid in said cavity, a valve housing having an inlet and an outlet chamber separated by a web, an opening through the web having a marginal seat opening into the outlet chamber, a conduit for fluid connecting said diaphragm cavity with said outlet chamber, said conduit being concentric with respect to said seat and having one end extending through said valve housing and terminating above said seat, a valve member slidably disposed within said conduit and having a disc adapted to move toward and away from said seat to regulate fluid flow through said web opening, in response to movement of said diaphragm, said disc being of smaller diameter than said conduit to permit movement into said conduit with its bottom below said one end thereof in fully open position away from said seat, means responsive to the movement of said diaphragm for actuating said valve member, and a circumferential lip projecting axially from the disc surface and adapted to divert fluid flowing between said disc and said seat past said one end of the conduit to effect a reduction of pressure within said cavity.

2. The valve means of claim 1 in which said valve disc comprises a cup-like member having a rubber-like resilient insert with its exposed face lying in a plane beneath the edge of the side wall of the cup.

3. The valve means of claim 1 in which said disc is detachably secured to a valve stem connecting with said actuating means.

4. The valve means of claim 1 in which said valve seat is carried by a sleeve detachably secured within the web opening.

References Cited in the file of this patent

UNITED STATES PATENTS

| | | |
|---|---|---|
| 329,163 | Hatfield | Oct. 27, 1885 |
| 331,878 | Hatfield | Dec. 8, 1885 |
| 1,781,366 | Campula | Nov. 11, 1930 |
| 1,931,777 | Thrall | Oct. 24, 1933 |
| 2,306,746 | Niesemann | Dec. 29, 1942 |
| 2,315,370 | Hughes | Mar. 30, 1943 |
| 2,634,088 | Niesemann | Apr. 7, 1953 |
| 2,698,026 | Roberts | Dec. 28, 1954 |
| 2,701,578 | Hamilton | Feb. 8, 1955 |
| 2,704,550 | Brewer | Mar. 22, 1955 |
| 2,788,798 | Mueller | Apr. 16, 1957 |

FOREIGN PATENTS

| | | |
|---|---|---|
| 1,053,484 | France | of 1954 |